US012795455B2

(12) United States Patent

Siraj et al.

(10) Patent No.: US 12,795,455 B2

(45) Date of Patent: Nov. 10, 2026

(54) METHOD AND SYSTEM FOR CONFIGURING MULTI-LINK OPERATION IN A WIRELESS NETWORKING DEVICE

(71) Applicant: HEWLETT PACKARD ENTERPRISE DEVELOPMENT LP, Spring, TX (US)

(72) Inventors: Mohd Shahnawaz Siraj, San Jose, CA (US); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 330 days.

(21) Appl. No.: 18/532,829

(22) Filed: Dec. 7, 2023

(65) Prior Publication Data

US 2025/0193740 A1  Jun. 12, 2025

(51) Int. Cl.

| | |
|---|---|
| ***H04W 28/20*** | (2009.01) |
| ***H04L 5/00*** | (2006.01) |
| ***H04W 72/0453*** | (2023.01) |
| ***H04W 76/15*** | (2018.01) |

(52) U.S. Cl.

CPC ........... *H04W 28/20* (2013.01); *H04L 5/0048* (2013.01); *H04W 72/0453* (2013.01); *H04W 76/15* (2018.02)

(58) Field of Classification Search

None

See application file for complete search history.

(56) References Cited

U.S. PATENT DOCUMENTS

| | | | |
|---|---|---|---|
| 6,623,529 | B1 | 9/2003 | Lakritz |
| 7,207,005 | B2 | 4/2007 | Lakritz |
| 7,487,215 | B2 | 2/2009 | Magee et al. |
| 8,489,980 | B2 | 7/2013 | Lakritz |
| 10,541,973 | B2 | 1/2020 | Lakritz |

(Continued)

OTHER PUBLICATIONS

TP-Link Archer BE800 Review: A New and Promising Multi-Gig Wi-Fi 7 Router. https://dongknows.com/tp-link-archer-be800-be19000-wi-fi-7-router-review/. May 19, 2023. (Year: 2023).*

(Continued)

*Primary Examiner* — Andre Tacdiran

(74) *Attorney, Agent, or Firm* — Hewlett Packard Enterprise Patent Department

(57) ABSTRACT

An example method for configuring Multi-Link Operation (MLO) for a Service Set Identifier (SSID) configured on a wireless networking device is presented. An MLO configurator system receives an MLO selection specifying one or more radio frequency (RF) bands corresponding to the SSID. The MLO configurator system then determines an MLO configuration for the SSID based on the MLO selection and a radio configuration of the wireless networking device. The radio configuration specifies one or more operational RF bands on a plurality of radios of the wireless networking device, and the MLO configuration specifies MLO group RF bands selected from the operational RF bands. Once the MLO configuration for the SSID is determined, the MLO configurator system causes the wireless networking device to communicate with a client device over the SSID via the MLO group RF bands for the SSID.

12 Claims, 7 Drawing Sheets

(56) References Cited

U.S. PATENT DOCUMENTS

| | | | | |
|---|---|---|---|---|
| 2003/0051164 | A1 | 3/2003 | Patton | |
| 2006/0059413 | A1 | 3/2006 | Tran | |
| 2008/0170256 | A1 | 7/2008 | Matsuhara et al. | |
| 2016/0094387 | A1* | 3/2016 | Stephenson | H04W 12/06<br>709/222 |
| 2021/0117494 | A1 | 4/2021 | Pande et al. | |
| 2021/0212045 | A1* | 7/2021 | Cherian | H04W 74/0816 |
| 2021/0287003 | A1 | 9/2021 | Matsuo | |
| 2024/0107306 | A1* | 3/2024 | Yoshikawa | H04W 76/15 |
| 2024/0114393 | A1* | 4/2024 | Min | H04L 43/0888 |
| 2024/0224349 | A1* | 7/2024 | Inohiza | H04W 76/15 |
| 2024/0381462 | A1* | 11/2024 | Barton | H04W 24/08 |

OTHER PUBLICATIONS

TP-Link Launches Next-Gen Wi-Fi 7 Deco Mesh System and Archer Router atTP-Link Launches Next-Gen Wi-Fi 7 Deco Mesh System and Archer Router atBest Buy and AmazonBest Buy and Amazon. https://www.tp-link.com/us/press/news/20641/. May 15, 2023. (Year: 2023).*

* cited by examiner

METHOD AND SYSTEM FOR CONFIGURING MULTI-LINK OPERATION IN A WIRELESS NETWORKING DEVICE

BACKGROUND

The Institute of Electrical and Electronics Engineers (IEEE) 802.11be Standard (generally known as Wi-Fi 7) is the successor to the IEEE 802.11ax Standard (generally known as Wi-Fi 6) and which promises to significantly boost the speed and stability of wireless connections while offering lower latency and the ability to seamlessly manage more connections than prior. This is achieved, at least in part, due to a feature called Multi-Link Operation (MLO) proposed in Wi-Fi 7. The MLO enables devices to simultaneously send and receive data across different frequency bands and channels, such as a 2.4 GHz Wi-Fi band, a 5 GHz Wi-Fi band, and a 6 GHz Wi-Fi band. While the MLO allows the access points and client devices to communicate simultaneously across different frequency bands, the configuration of the MLO may become challenging due to advanced radio frequency filtering techniques that allow the AP to operate with several combinations of the frequency bands and sub-bands within such frequency bands.

BRIEF DESCRIPTION OF THE DRAWINGS

One or more examples in the present disclosure are described in detail with reference to the following Figures. The Figures are provided for purposes of illustration only and merely depict examples.

Figure 1:
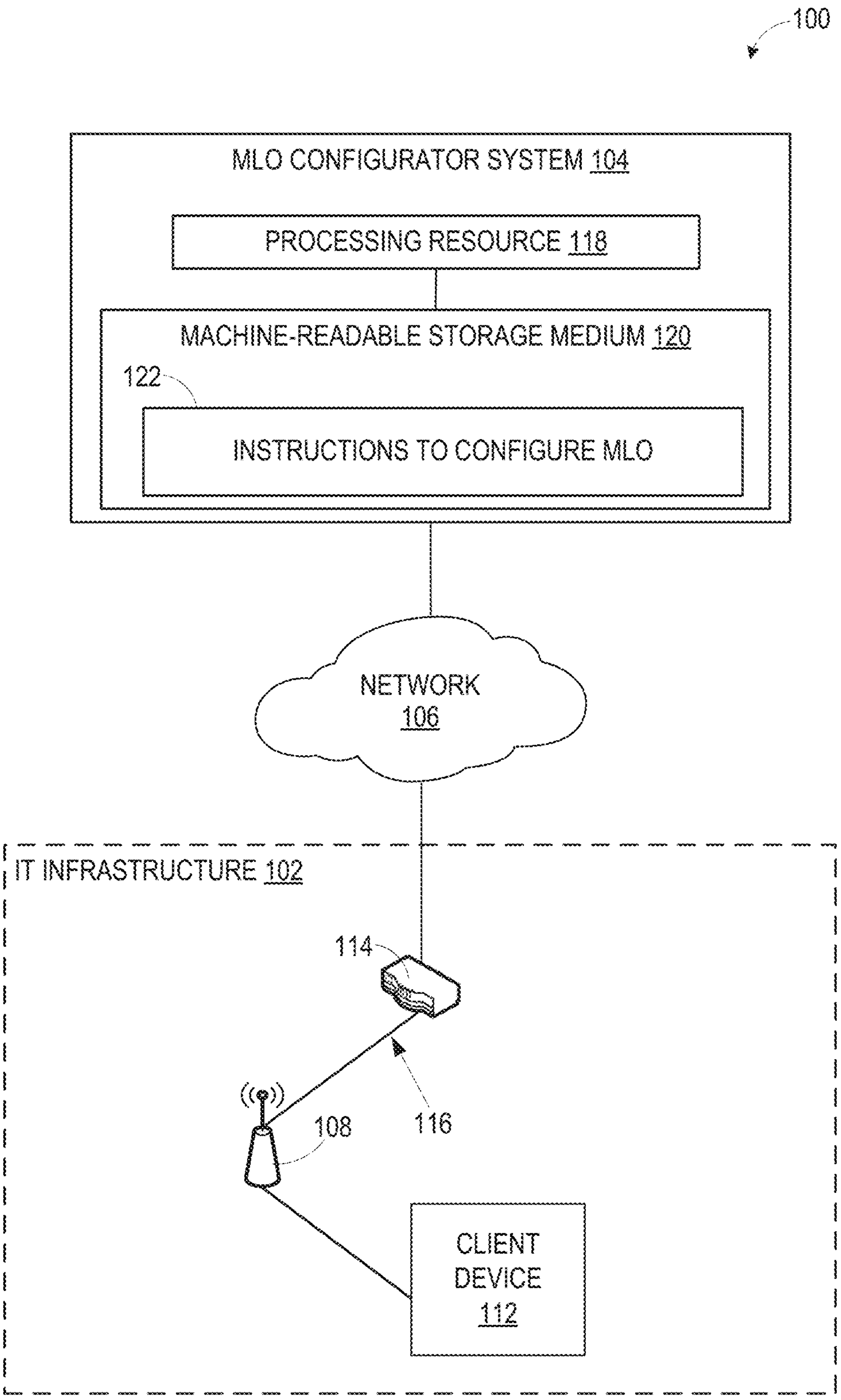
FIG. 1 depicts a block diagram of an example network environment in which various of the examples presented herein may be implemented.

The Figures are not exhaustive and do not limit the present disclosure to the precise form disclosed.

DETAILED DESCRIPTION

The Multi-Link Operation (MLO) feature of the Wi-Fi 7 enables wireless devices to merge multiple frequency bands into a single, seamless wireless connection, unlike previous Wi-Fi standards that allowed connections between two devices on a single band. In particular, with the introduction of the Wi-Fi 7, client devices can now connect to an access point (AP) simultaneously across multiple frequency bands, which significantly increases the potential bandwidth available to the client. In particular, by enabling the client devices to take advantage of multiple frequency bands at the same time, MLO can provide faster and more reliable wireless connections, even in areas with high network traffic. This makes the Wi-Fi 7 a significant upgrade over the previous Wi-Fi standards and is expected to improve the user experience for those who rely on wireless networks for their day-to-day activities.

Further, with recent advancements in wireless communication technology, wireless networking devices such as APs are equipped with advanced radio frequency (RF) filters. These advanced RF filters allow an AP to operate in one of several modes in which the radios in the AP operate with specific combinations of RF bands that align with the customer deployment requirements. Each mode of the AP defines a respective radio configuration specifying what radio frequency band each radio is operating on. Table-1 presented below lists some such example modes for an AP with three (3) radios-Radio A, Radio B, and Radio C. In Table 1, the acronyms FB, HB, and LB refer to "full band," "higher band," and "lower band," respectively.

TABLE 1

Example RF configurations for an AP with three radios

| Mode | Mode Name | Radio A | Radio B | Radio C |
|---|---|---|---|---|
| 1 | Tri-Band | 6 GHz FB | 5 GHz FB | 2.4 GHz FB |
| 2 | Dual Band (+scan) | 6 GHz FB | 5 GHz FB | All Band Scan |
| 3 | Split 5 GHz | 6 GHz FB | 5 GHz LB | 5 GHz HB |
| 4 | Split 5 GHz (+scan) | 6 GHz FB | 5 GHz LB | All Band Scan |
| 5 | Split 6 GHz (+5 GHz) | 6 GHz HB | 6 GHz LB | 5 GHz FB |
| 6 | Split 6 GHz (+2.4 GHz) | 6 GHz HB | 6 GHz LB | 2.4 GHz FB |
| 7 | Split 6 G (+scan) | 6 GHz HB | 6 GHz LB | All Band Scan |

The HB and LB may be frequency ranges within a given Wi-Fi frequency band (for example, the 5 GHz Wi-Fi band or the 6 GHz Wi-Fi band). In particular, for a given Wi-Fi frequency band, the HB may include a range of frequencies in the upper half of the given Wi-Fi frequency band, whereas the LB may include a range of frequencies in the lower half of the given Wi-Fi frequency band. Table 2 represents example frequency ranges in each of the Wi-Fi bands listed in Table-1.

TABLE 2

Example Frequency Ranges

| Wi-Fi band/sub-band | Frequency range |
|---|---|
| 2.4 GHz FB | 2401 MHz-2495 MHz |
| 5 GHz FB | 5150 MHz-5895 MHz |
| 6 GHz FB | 5945 MHz-7125 MHz |
| 5 GHz LB | 5150 MHz-5330 MHz |
| 5 GHz HB | 5490 MHz-5895 MHz |
| 6 GHz LB | 5945 MHz-6425 MHz |
| 6 GHz HB | 6525 MHz-7125 MHz |

One potential way to configure the MLO for an AP would be to create a centralized control at the AP level that can enable or disable the MLO for the AP. Such an MLO configuration may group all the Service Set Identifiers (SSIDs) that have been created for each RF band supported on the AP. For instance, if an AP is configured with SSIDs—'Guest' and 'Corporate' that support both 2.4 GHz and 5 GHz Wi-Fi bands, enabling the MLO for the AP would mean that both the 'Guest' and 'Corporate' SSIDs would be part of an MLO group across both 2.4 GHz and 5 GHz Wi-Fi bands. However, this approach may not be ideal for enterprise deployments, where administrators require more granular control in the MLO configuration. Additionally, this approach may not be easily extensible in cases where the AP supports modes described hereinabove. In particular, a change in the AP's modes may require reconfiguring the MLO groups leading to increased manual efforts for the administrators.

Moreover, the manual configuration of the MLO for each SSID may require an administrator to ensure that all SSIDs on all RF bands are included in the correct MLO group. This could become difficult and time-consuming to manage as the number of SSIDs and RF bands supported by an AP increases, particularly in larger enterprise environments. Additionally, any changes to the MLO configuration would require the administrator to manually update each group, which could be error-prone and time-consuming.

To address these challenges posed by the above configuration options, in examples consistent with the teachings of this disclosure, a processor-based system is proposed that simplifies the MLO configuration while providing IT administrators with greater flexibility and control. The processor-based system may be deployed locally inside a wireless networking device or hosted in a cloud infrastructure. In one example, the proposed processor-based system enables an intuitive user interface that allows administrators to enable MLO on a per-SSID basis, as well as selecting the RF bands to include in each MLO group. Based on the selection of the RF bands to include in each MLO group, the processor-based system automatically configures an MLO group for the SSID based on AP's radio configuration.

In accordance with the examples presented herein, the processor-based system receives an MLO selection (e.g., via the user interface) specifying one or more RF bands corresponding to an SSID configured on a wireless networking device (e.g., an AP). The processor-based system then determines a radio configuration of the AP identifying one or more operational RF bands on a plurality of radios of the AP. In particular, the radio configuration of the AP defines what RF band each radio is configured to operate with. Then, based on the MLO selection and the radio configuration of the AP, the processor-based system determines an MLO configuration for the SSID. The MLO configuration specifies MLO group RF bands selected from the operational RF bands. Once the MLO configuration is determined, the processor-based system enables the AP to communicate with a client device over the SSID via the MLO group RF bands for the SSID.

As will be appreciated, the proposed processor-based system allows configuring the MLO per SSID basis providing finer control over which SSIDs are included in MLO groups, and how those groups are formed across different RF bands. Also, by providing a user-friendly interface, the proposed processor-based system simplifies the MLO configuration process and enables administrators to quickly and easily define MLO groups that suit their organization's specific needs. This, in turn, would help improve the overall network performance, as well as the user experience for all wireless network users.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented for any setup, for example, in a home setup or an organization, such as a business, educational institution, governmental entity, healthcare facility, or other organization. The system 100 may include an IT infrastructure 102, or both the IT infrastructure 102 and an MLO configurator system 104. In FIG. 1, although the MLO configurator system 104 is shown external to the IT infrastructure 102, in some examples, the MLO configurator system 104 may be a part of the IT infrastructure 102. In certain examples, a wireless networking device deployed in the IT infrastructure 102 may be configured to implement the functionalities of the MLO configurator system 104 (see FIG. 2).

The IT infrastructure 102 may be of a small-scale network of devices or a large-scale network of devices. The small-scale network of devices may be a home network, for example. The large-scale network of devices may be an organization, university, public utility space (e.g., mall, airport, railway station, bus station, stadium, etc.), or office network hosting a large number of network devices, for example. The IT infrastructure 102 may span across more than one site, for example, a room, a floor of a building, a building, or any other space that can host network devices. The IT infrastructure 102 may be a private network, such as a network that may include security and access controls to restrict access to authorized users of the private network.

The IT infrastructure 102 may include several devices that communicate with each other and/or with any external device or system outside the IT infrastructure 102. The IT infrastructure 102 may include a wireless networking device such as an AP 108 and a client device 112. Further, in some examples, the IT infrastructure 102 may optionally include a controller 114 that is in communication with an external network 106. It is to be noted that the examples presented herein are not limited by the specifics (e.g., types and counts) of the devices depicted in FIG. 1. In some examples, the AP 108, the client device 112, and the controller 114 may be configured to communicate other devices using wireless communication techniques specified in one or more IEEE 802.11 standard specifications. The AP 108 may act as a point of access to a local network established in IT infrastructure 102 and/or the external network 106 for the client device 112. The AP 108 may be a combination of hardware, software, and/or firmware that is configured to provide wireless network connectivity to the client device 112. The AP 108 may communicate with the client devices (e.g., the client device 112) in accordance with one or more IEEE 802.11 standard specifications.

The network 106 may be a public or private network, such as the Internet, or another communication network to allow connectivity between the IT infrastructure 102 and the MLO configurator system 104. The network 106 may include third-party telecommunication lines, such as phone lines, broadcast coaxial cables, fiber optic cables, satellite communications, cellular communications, and the like. In some examples, the network 106 may include any number of intermediate network devices, such as switches, routers, gateways, servers, and/or controllers, which are not directly part of the IT infrastructure 102 but that facilitate communication between the various parts of the IT infrastructure 102, and between the IT infrastructure 102 and any other network-connected entities. The examples of client device 112 may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, virtual terminals, video game consoles, virtual assistants, Internet-of-Things (IoT) devices, and the like.

The AP 108 may be implemented with one or more radios to help the AP communicate with other wireless-capable devices. Each radio may operate on a respective range of radio frequency ranges, referred to as a Wi-Fi band, for example, the 2.4 GHz Wi-Fi band, 5 GHz Wi-Fi band, the 6 GHz Wi-Fi band, and so on. With the support of IEEE Wi-Fi 7 802.11be Standard, key features such as MLO may present some new opportunities to utilize the radios dynamically and flexibly on AP 108 to offer channels amenable to delivering higher throughput and low latency. Further, with recent advancements in wireless communication technology, wireless networking devices such as the AP 108 may be equipped with advanced RF filters. These advanced RF filters may allow the AP 108 to operate in one of several RF configurations (see Table-1) in which the radios in the AP 108 operate with specific combinations of RF bands that align with the customer deployment requirements.

The AP 108 may communicate with the controller 114 over respective connections 116, which may include wired and/or wireless interfaces. The controller 114 may provide communication with the network 106 for the IT infrastructure 102, though it may not be the only point of communication with the network 106 for the IT infrastructure 102. In some examples, the controller 114 may communicate with the network 106 through a router (not shown). In other implementations, the controller 114 may provide router functionality to the devices in the IT infrastructure 102. In some examples, the controller 114 may be a wireless local area network (WLAN) controller. The controller 114 may be operable to configure and manage network devices, such as at the IT infrastructure 102, and may also manage network devices at other remote sites, if any, within the IT infrastructure 102. The controller 114 may be operable to configure and/or manage switches, routers, access points, and/or client devices connected to a network. The controller 114 may itself be, or provide the functionality of, an AP.

As will be appreciated, with recent advancements in the technology, wireless networking devices such as the AP 108 include multiple radios which may be operated on respective frequency bands (hereinafter referred to as Wi-Fi bands or simply bands). Also, depending on the network requirements, the radio configurations of the radios may be altered. The term radio configuration may refer to details on which band is operational on a given radio. In such a dynamic network environment, without systematic management, managing MLO configurations on the APs may be challenging. The MLO configurator system 104, in accordance with the examples presented herein, simplifies the MLO configuration task for the network administrators by aiding in dynamically configuring MLO groups for the AP 108 with minimal initial human inputs.

The MLO configurator system 104 may be deployed on a cloud platform hosted on a public, private, or hybrid cloud outside the IT infrastructure 102. In some examples, the MLO configurator system 104 may be implemented as one or more computing systems, for example, computers, controllers, servers, or storage systems. In certain examples, the MLO configurator system 104 may be an electronic device having a hardware processing resource 118, such as one or more central processing units (CPUs), semiconductor-based microprocessors, and/or other hardware devices suitable for retrieval and execution of instructions 122 stored in a machine-readable storage medium 120 (described later). In certain other examples, the MLO configurator system 104 may be implemented as a software resource, such as a software application, a virtual machine (VM), a container, a containerized application, or a pod. In some examples, the MLO configurator system 104 may be implemented as a service running on a "cloud computing" environment or as a "software as a service" (SaaS). The MLO configurator system 104 may be offered as a stand-alone product/service or a packaged solution that can be utilized on a one-time full product/solution purchase or pay-per-use basis.

In certain other examples, not shown in FIG. 1, the MLO configurator system 104 may be deployed within the IT infrastructure 102. In such an implementation, the MLO configurator system 104 may be connected to controller 114 or the AP 108. In some other examples, the MLO configurator system 104 may be implemented within a wireless networking device (see FIG. 2), for example, the AP 108. In an alternative implementation, the controller 114 may be configured to operate as the MLO configurator system 104.

The machine-readable storage medium 120 of the MLO configurator system 104 may be non-transitory and is alternatively referred to as a non-transitory machine-readable storage medium that does not encompass transitory propagating signals. The machine-readable storage medium 120 may be any electronic, magnetic, optical, or another type of storage device that may store data and/or executable instructions. Examples of the machine-readable storage medium 120 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium 120 may be encoded with instructions 122 to configure MLO. Although not shown, in some examples, the machine-readable storage medium 120 may be encoded with certain additional executable instructions to perform any other operations performed by the MLO configurator system 104, without limiting the scope of the present disclosure.

The processing resource 118 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 120, or combinations thereof. The processing resource 118 may fetch, decode, and execute the instructions 122 stored in the machine-readable storage medium 120 to configure MLO. As an alternative or in addition to executing the instructions 122, the processing resource 118 may include at least one integrated circuit (IC), control logic, electronic circuits, or combinations thereof that include a number of electronic components for performing the functionalities intended to be performed by the MLO configurator system 104. In some examples, when the MLO configurator system 104 is implemented as a virtual resource (e.g., a VM, a container, or a software application), the processing resource 118 and the machine-readable storage medium 120 may respectively represent a processing resource and a machine-readable storage medium of a host system hosting the MLO configurator system 104 as the virtual resource.

In examples consistent with the teachings of this disclosure, the MLO configurator system 104 aids in configuring the multi-link operation for a wireless networking device, for example, the AP 108, by way of the processing resource 118 executing the instructions 122. In some examples, the processing resource 118 may execute one or more of the instructions 122 to perform the method steps described in conjunction with one or more of FIGS. 4-6. In particular, the MLO configurator system 104 may enable an intuitive user interface (see FIG. 3) that allows administrators to enable MLO on a per-SSID basis, as well as selecting the RF bands to include in each MLO group. Based on the selection of the RF bands to include in each MLO group, the MLO configurator system 104 automatically configures an MLO group for the SSID based on AP's radio configuration. Additional details about how a cloud-hosted MLO configurator system such as the MLO configurator system 104 configures MLO are described in conjunction with FIG. 6.

As will be appreciated, the proposed MLO configurator system 104 allows configuring the MLO per SSID basis providing finer control over which SSIDs are included in MLO groups, and how those groups are formed across different RF bands. Also, by providing a user-friendly interface, the proposed processor-based system simplifies the MLO configuration process and enables administrators to quickly and easily define MLO groups that suit their organization's specific needs. This, in turn, would help improve the overall network performance, as well as the user experience for all wireless network users.

Figure 2:
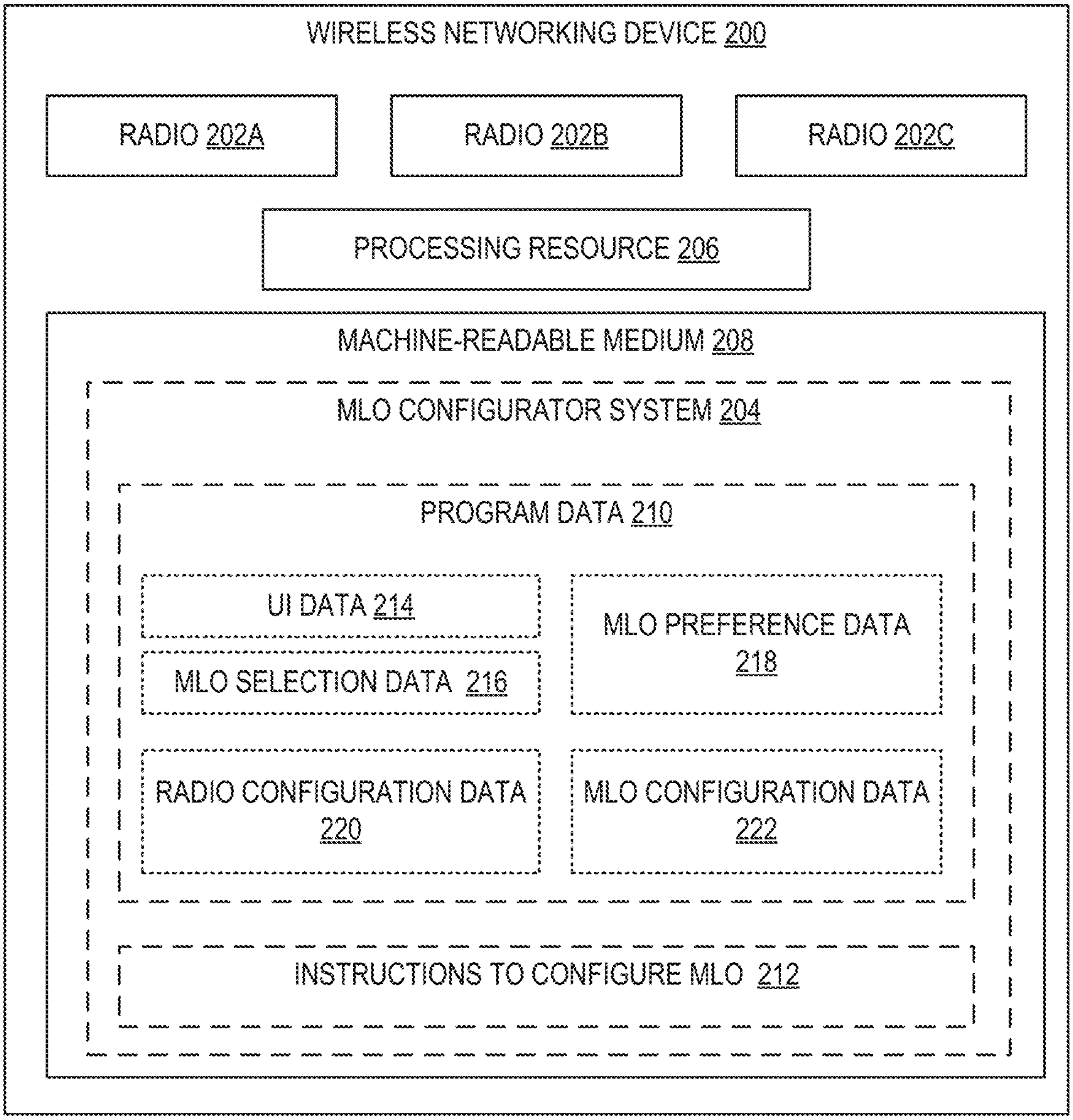
FIG. 2 depicts a block diagram of a wireless networking device in which various of the examples presented herein may be implemented.

Referring now to FIG. 2, a block diagram of an example wireless networking device 200 is presented. In some examples, the wireless networking device 200 of FIG. 2 may be an AP, a WLAN controller, or a router. In particular, the wireless networking device 200 is configured with the local capability of configuring MLO in accordance with the examples of the present disclosure. The wireless networking device 200 may include a plurality of radios, for example, radios 202A, 202B, and 202C (hereinafter collectively referred to as the radios 202A-C), to enable the wireless networking device 200 to communicate with other wireless capable devices over one or more Wi-Fi bands. Further, to enable efficient configuration MLO and thereby allow the wireless networking device 200 to communicate with client devices over more than one frequency band simultaneously, the wireless networking device 200 includes an MLO configurator system 204.

The radios 202A-C allows the wireless networking device 200 to communicate with the client devices (not shown) or any other wireless-capable devices in accordance with one or more IEEE 802.11 standard specifications. The radios 202A-C may include a transmitter and/or a receiver to aid in data communication. In some examples, the radios 202A-C may include electronics (e.g., signal processing circuits such as but not limited to amplifiers, modulators, demodulators, phase-shifters, signal comparators, signal conditioning circuits, etc.) useful to process the signals that are received and/or transmitted by the wireless networking device 200. In some examples, each of the radios 202A-C may operate at one or more frequency bands (e.g., the 2.4 GHz Wi-Fi band, the 5 GHz Wi-Fi band, or the 2.4 GHz Wi-Fi band) or any sub-bands within such frequency bands. It will be understood by one skilled in the art that the radios 202A-C may operate at any suitable frequency band and conform to any suitable type(s) of wireless communication standards, now known and later developed. Moreover, although FIG. 2 shows wireless networking device 200 comprising three radios, it will be understood by one skilled in the art that wireless networking device 200 may comprise any suitable number of radios.

Further, the wireless networking device 200 may include a plurality of antennas (not shown), for example, an antenna connected to each of the radios 202A-C. Such antennas, in some examples, may transmit and/or receive directional signals, omnidirectional signals, or a combination thereof. It will be understood by one skilled in the art that the antennas may comprise any suitable type(s) of antenna, now known and later developed.

Furthermore, the wireless networking device 200 may include a processing resource 206 and/or a machine-readable storage medium 208 for the wireless networking device 200 to execute several operations as will be described in the greater details below. The processing resource 206 may be a physical device, for example, a CPU, a microprocessor, a GPU, an FPGA, an ASIC, other hardware devices capable of retrieving and executing instructions stored in the machine-readable storage medium 208, or combinations thereof. The processing resource 206 may fetch, decode, and execute the instructions stored in the machine-readable storage medium 208 to configure MLO on the wireless networking device 200. As an alternative or in addition to executing the instructions, the processing resource 206 may include at least one integrated circuit (IC), control logic, electronic circuits, or combinations thereof that include a number of electronic components for performing the functionalities intended to be performed by the wireless networking device 200.

The machine-readable storage medium 208 may be non-transitory and is alternatively referred to as a non-transitory machine-readable storage medium that does not encompass transitory propagating signals. The machine-readable storage medium 208 may be any electronic, magnetic, optical, or another type of storage device that may store data and/or executable instructions. Examples of the machine-readable storage medium 208 may include RAM, NVRAM, EEPROM, a storage drive (e.g., SSD or HDD), a flash memory, and the like. The machine-readable storage medium 208 may be encoded with an MLO configurator system 204 that aids in configuring MLO for the wireless networking device 200. The MLO configurator system 202 includes a program data 210 and instructions 212 to configure MLO. Although not shown, in some examples, the machine-readable storage medium 208 may be encoded with certain additional executable instructions to perform any other operations performed by the wireless networking device 200, without limiting the scope of the present disclosure.

In some examples, the program data 210 may include a UI data 214, an MLO selection data 216, an MLO preference data 218, a radio configuration data 220, and an MLO configuration data 222. In particular, the UI data 214 may store data using which the processing resource 206 creates an MLO configuration UI (see FIG. 3, for example) for a user to provide inputs for MLO configuration. The MLO selection data 216 may be a datastore representative of user inputs that the MLO configurator system receives via the MLO configuration UI. Further, the MLO preference data 218 represents MLO preference determined based on the user inputs stored in the MLO selection data 216. Furthermore, the radio configuration data 220 may represent details about the operating Wi-Fi band on each of the radios 202A-C; and the MLO configuration data 222 stores MLO configuration determined for one or more of the SSIDs advertised by the wireless networking device 200. Details about receiving user inputs, and identifying the radio configurations, MLO preferences, and MLO configurations are described in conjunction with the methods described in FIGS. 4-6.

In accordance with examples consistent with the present disclosure, the wireless networking device 200 may execute the MLO configurator system 204, by way of the processing resource 206 executing the instructions 212, to configure MLO for SSIDs operating on the wireless networking device 200. In particular, in some examples, the processing resource 206 may execute one or more of the instructions 212 to perform the method steps described in conjunction with FIGS. 4 and 5.

Figure 3:
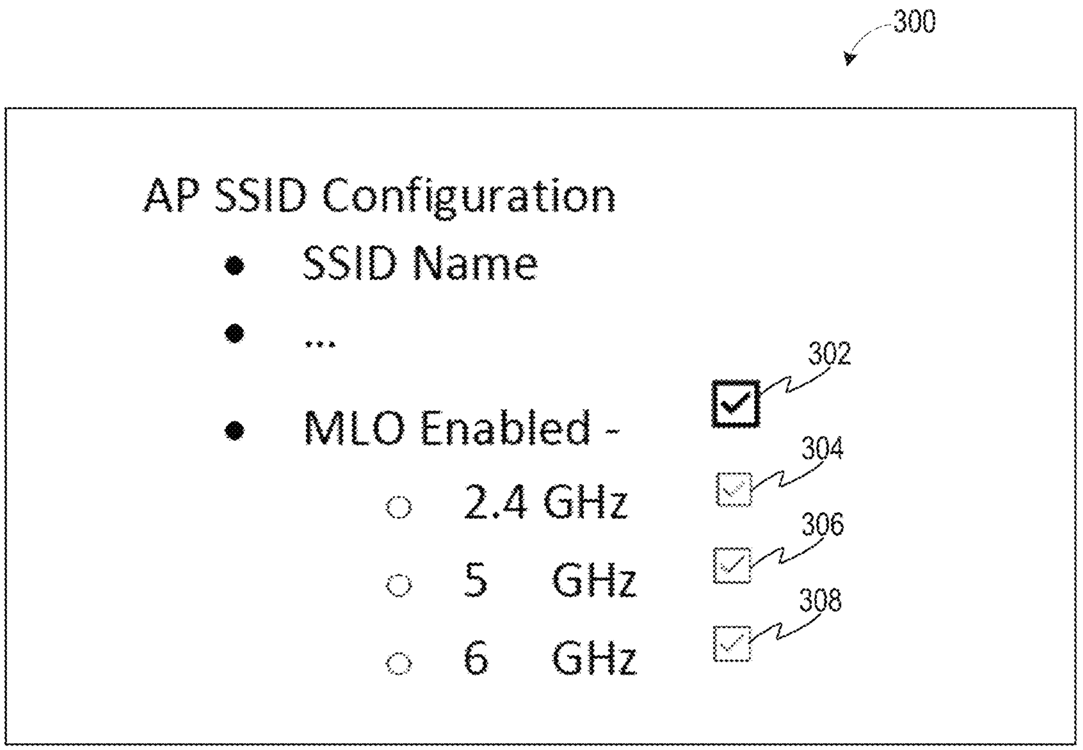
FIG. 3 depicts an example MLO configuration user interface (UI) presented by an MLO configurator system to enable a user to input an MLO selection.

Referring now to FIG. 3, an example MLO configuration UI 300 is presented to enable a user to provide MLO configuration inputs. In one example, the MLO configuration UI 300 may be created by the MLO configurator system 204 of FIG. 2 and is displayed as part of a device configuration console or as an independent web console, and may be accessed using a URL or a predefined IP address. In another example, the MLO configuration UI 300 may be created by the MLO configurator system 104 of FIG. 1 and is displayed on a web page that may be accessed using a URL or a predefined IP address. In some examples, the MLO configurator system 204 of FIG. 2 may create the MLO configuration UI 300 based on the UI data 214 stored in the machine-readable storage medium 208.

The MLO configuration UI 300 displays an SSID (based on a user's selection of a particular SSID) for which the user intends to configure MLO. Further, the MLO configuration UI 300 may include several input objects 302, 304, 306, and 308 to receive user inputs. For illustration purposes, the input objects 302, 304, 306, and 308 are shown as check-boxes. The use of other types of suitable input objects is also envisioned within the scope of the present disclosure. By operating (e.g., checking or unchecking) the input object 302 the user may toggle (e.g., enable or disable) the MLO feature for the SSID. Further, by operating the input objects 304, 306, and 308, the user can select two or more Wi-Fi bands to include in an MLO group for the SSID. By way of example, by operating the input objects 304, 306, and 308, the user can select two or more of the 2.4 GHz Wi-Fi band, the 5 GHz Wi-Fi band, or the 6 GHz Wi-Fi band to include in an MLO group for the SSID. As will be understood, the MLO configuration UI 300 may include more or fewer band selection input objects depending on the number of Wi-Fi bands. Also, the MLO configuration UI 300 may be updated to include newer Wi-Fi bands or to remove any obsolete Wi-Fi bands as technology advances.

Figure 4:
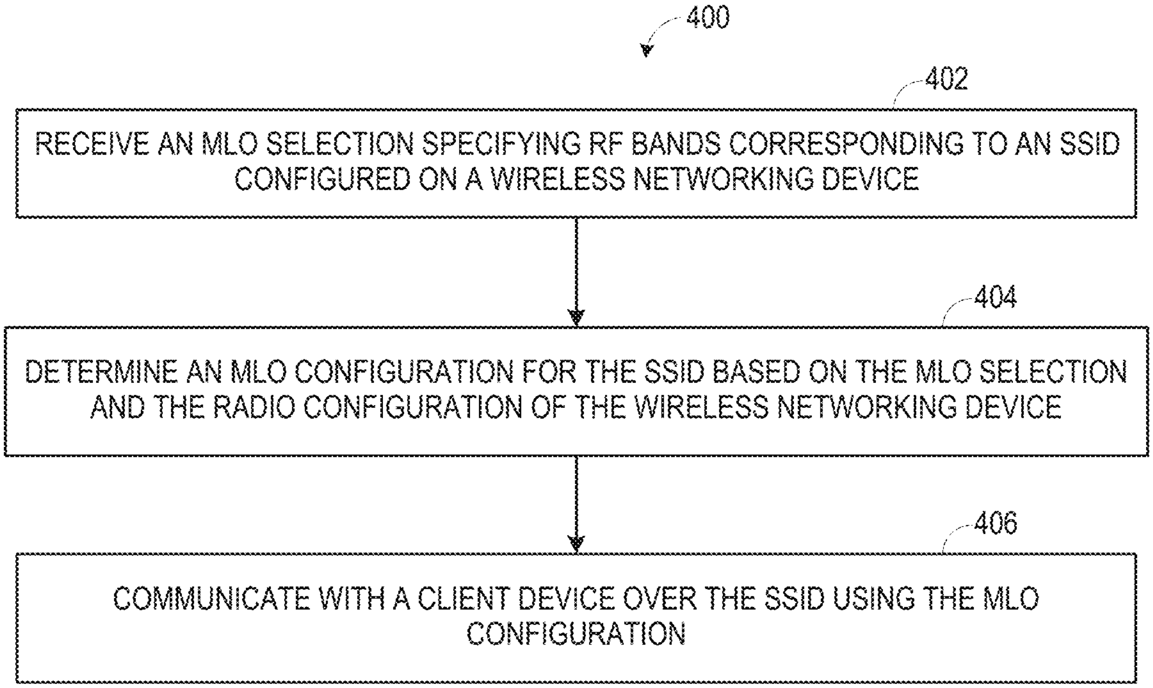
FIG. 4 depicts a flowchart of an example method for configuring MLO locally at a wireless networking device.
Figure 5:
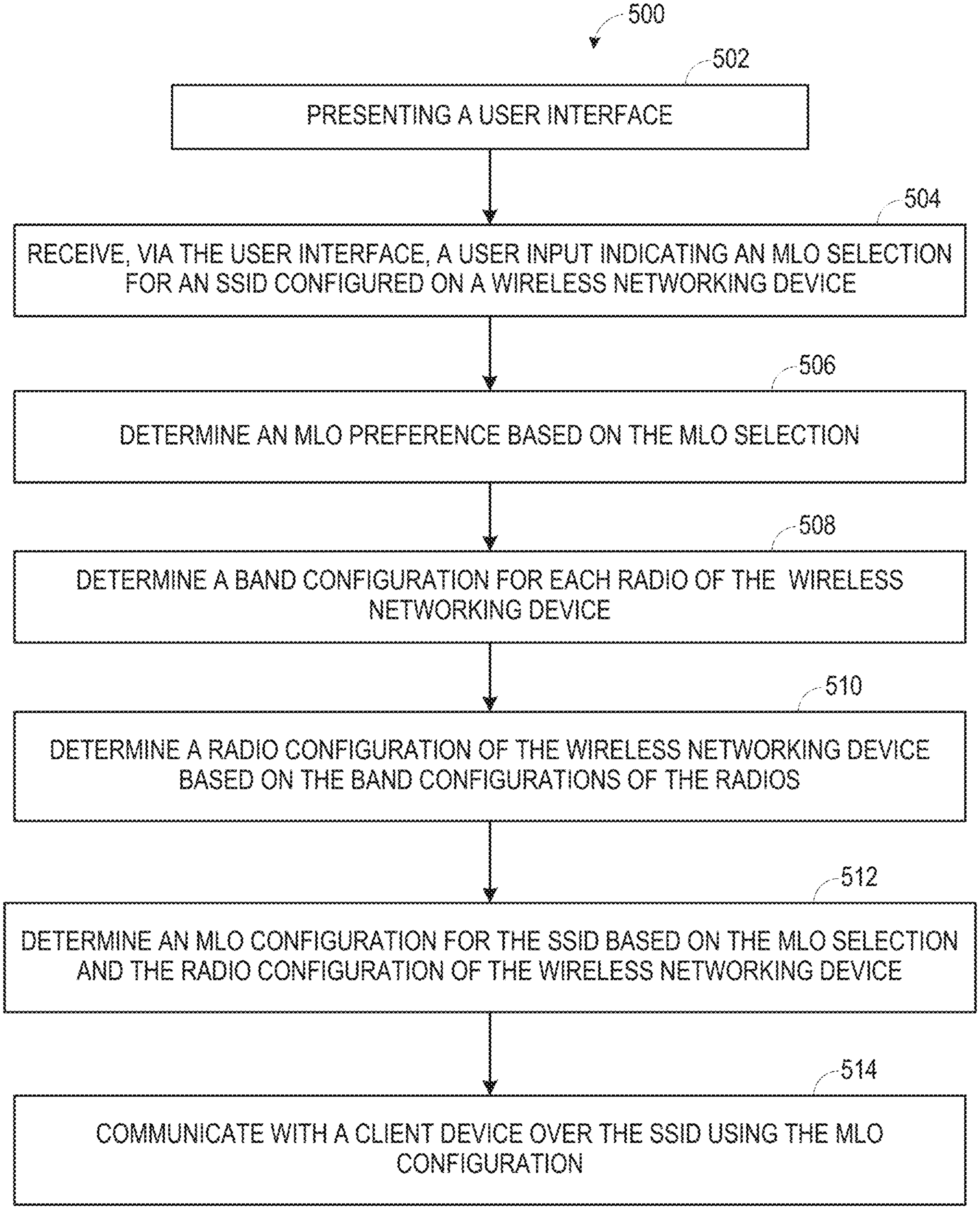
FIG. 5 depicts a flowchart of another example method for configuring MLO locally at a wireless networking device.

Turning now to FIGS. 4 and 5, flowcharts of example methods for configuring MLO are depicted. The steps shown in FIGS. 4 and 5 may be performed locally at any suitable device, such as a wireless networking device (e.g., the wireless networking device 200 of FIG. 2). In some examples, the suitable device may include a processing resource suitable for retrieval and execution of instructions (e.g., the instructions 212 depicted in FIG. 2) stored in a machine-readable storage medium. The processing resource and the machine-readable storage medium may be example representatives of the processing resource 206 and the machine-readable storage medium 208 of the wireless networking device 200. As an alternative or in addition to retrieving and executing instructions, the processing resource may include one or more electronic circuits that include electronic components for performing the functionality of one or more instructions, such as an FPGA, ASIC, or other electronic circuits.

FIG. 4 depicts a method 400 for configuring MLO for an SSID operational on a wireless networking device via an MLO configurator system hosted locally at the wireless networking device, in accordance with an example. At step 402, the MLO configurator system receives an MLO selection specifying one or more radio frequency (RF) bands corresponding to an SSID configured on the wireless networking device. In one example, the MLO configurator system receives MLO selection from a UI, for example, the MLO configuration UI 300 of FIG. 3. The MLO selection specifies the Wi-Fi bands that are selected to be included in an MLO group for the SSID. In one example, the user may select to enable MLO for all bands, for example, for the 2.4 GHz Wi-Fi band, the 5 GHZ Wi-Fi band, and the 6 GHz Wi-Fi band.

Further, at step 404, the MLO configurator system determines an MLO configuration for the SSID based on the MLO selection and a radio configuration of the wireless networking device. The radio configuration of the wireless networking device specifies one or more operational RF bands on a plurality of radios (e.g., the radios 202A-C) of the wireless networking device. For example, the wireless networking device may be configured to operate in any of the modes specified in Table-1 which may in turn specify the radio configuration of the wireless networking device. For example, for the operation of the wireless networking device in mode 3 (Split 5 GHZ, see Table 1), the radios 202A, 202B, and 202C may respectively be operated on 5 GHZ HB, 5 GHZ LB, and 6 GHz FB. Accordingly, the 5 GHZ HB, 5 GHZ LB, and 6 GHZ FB are determined as operating bands for the wireless networking device. The MLO configurator system may process (e.g., by way of performing vector operations—described in FIG. 5) both the radio configuration of the wireless networking device and the MLO selection to determine the MLO configuration. The MLO configuration specifies MLO group RF bands selected from one or more operational RF bands. In the example of the wireless networking device operating in the Split 5 GHz mode and the MLO selection specifying all bands for enabling MLO, the MLO configuration may define the MLO group RF bands including all of the 5 GHZ HB, 5 GHZ LB, and 6 GHZ FB. Detailed steps for determining the MLO configuration are described in conjunction with FIG. 5.

After the MLO configuration defining the MLO group RF bands is determined, the wireless networking device, at step 406, may communicate with client devices over the SSID using the MLO configuration determined at step 404. In particular, the wireless networking device may communicate with the client devices connected over the SSID via the MLO group RF bands identified in the MLO configuration.

Moving to FIG. 5, another example method 500 for configuring MLO for an SSID operational on a wireless networking device via an MLO configurator system hosted locally at the wireless networking device is presented. In particular, the method 500 of FIG. 5 describes certain additional steps compared to the method 400 of FIG. 4. Certain details that are already described in FIG. 4 are not repeated herein for the sake of brevity. At step 502, the MLO configurator system of the wireless networking device presents an MLO configuration UI (e.g., the MLO configuration UI 300 of FIG. 3) on a display accessible to a user. The MLO configuration UI displays an SSID and several input objects to enable the user to provide MLO selection inputs. The user may select suitable options via the MLO configuration UI which may trigger certain inputs to the MLO configurator system for the SSID. At step 504, the MLO configurator system receives the user inputs indicating the MLO selection via the MLO configuration UI. In particular, the MLO selection may indicate Wi-Fi bands that the user is interested in including in the MLO group for the SSID.

Further, at step 506, the MLO configurator system may determine an MLO preference for the SSID based on the MLO selection. In one example, the determine the MLO preference, the MLO configurator system may first determine a band-wise MLO preference-MLO(X) for each of the supported bands or sub-bands X, where X indicates a Wi-Fi band or a sub-band (hereinafter simply referred to as a band) within the Wi-Fi band. If the total number of bands supported by the wireless networking device is M, the value of X may be between 0 to M−1. A value of MLO(X) indicates whether the band X is preferred in the user inputs. MLO(X) is set to 1, if the band X is selected in the user inputs. However, MLO(X) is set to 0 if the band X is not selected in the user inputs. For an AP that supports five bands (i.e., M−5, 0≤X≤4), such as the 2.4 GHz Wi-Fi band and the sub-bands 5 GHZ LB, 5 GHZ HB, 6 GHZ LB, and 6 GHz HB, the values of band-wise MLO preferences may be:

MLO (0)=0 or 1, depending on the selection of the 2.4 GHz Wi-Fi band;

MLO (1)=0 or 1, depending on the selection of the 5 GHz LB Wi-Fi sub-band;

MLO (2)=0 or 1, depending on the selection of the 5 GHz HB Wi-Fi sub-band;

MLO (3)=0 or 1, depending on the selection of the 6 GHZ LB Wi-Fi sub-band; and

MLO (4)=0 or 1, depending on the selection of the 6 GHz HB Wi-Fi sub-band;

For such an AP that supports the above-mentioned five bands, if the MLO selection indicates that the user has selected all three bands for MLO via the MLO configuration UI, the values of band-wise MLO preferences may be:

MLO (0)=1;
MLO (1)=1;
MLO (2)=1;
MLO (3)=1; and
MLO (4)=1.

In one example, the MLO preference-MLO (P) may be determined as a vector sum of the band-wise MLO preferences. The MLO preference may be determined using the following example relationship.

MLO (P)=[MLO (0), MLO (1), MLO (2), . . . , MLO (M−1)]

For the above example of the AP supporting five bands (M=5), the MLO preference may be represented as:

MLO (P)=[MLO (0), MLO (1), MLO (2), MLO (3), MLO (4)]

MLO (P)=[1, 1, 1, 1, 1]

Furthermore, at step 508, the MLO configurator system may determine a band configuration of the wireless networking device. The band configuration specifies one or more operational RF bands configured for each radio. In one example, to determine the band configuration, the MLO configurator system may first determine a radio-specific band configuration-Band (Y, X) for each of the radios of the wireless networking device, where Y (0≤Y≤N) indicates a radio of the wireless networking device and N indicates a maximum number of radios installed in the wireless networking device. For an AP that includes three radios (N=3), and supports five bands (M=5), values of Y that are 0, 1, and 2 respectively represent Radio 202C, Radio 202B, and Radio 202A; and values of X that are 0, 1, 2, 3, and 4 respectively represent bands 2.4 GHZ, 5 GHZ LB, 5 GHZ HB, 6 GHZ LB, and 6 GHz HB. Accordingly, the individual band configurations may be represented as follows.

Band (0, 0)=1
Band (0, 1)=0
Band (0, 2)=0
Band (0, 3)=0
Band (0, 4)=0
Band (1, 0)=0
Band (1, 1)=1
Band (1, 2)=1
Band (1, 3)=0
Band (1, 4)=0
Band (2, 0)=0
Band (2, 1)=0
Band (2, 2)=0
Band (2, 3)=1
Band (2, 4)=1

A value of 1 for the given individual band configuration Band (Y, X) indicates that the radio Y is operational on band X. In other words, the band X is an operational band for the radio Y. For example, Band (2, 3)=1 indicates that Radio 202A is operating on the 6 GHZ LB.

Once the individual band configurations-Band (Y, X) are determined, the MLO configurator system determines radio-specific band configurations represented as R (Y). The MLO configurator system may determine the radio-specific band configurations by aggregating the radio-specific band configurations. In some examples, the MLO configurator system may perform a vector addition of the radio-specific band configurations A radio-specific band configuration, may be represented using the following vector formulation.

R (Y)=[Band (Y, 1), Band (Y, 2), . . . , Band (Y, M−1)]

Accordingly, the radio-specific band configurations for the radios Radio 202C, Radio 202B, and Radio 202A respectively may be represented as R (0), R (1), and R (2), where:

R (0)=[Band (0, 0), Band (0, 1), Band (0, 2), Band (0, 3), Band (0, 4)]=[1, 0, 0, 0, 0];

R (1)=[Band (1, 0), Band (1, 1), Band (1, 2), Band (1, 3), Band (1, 4)]=[0, 1, 1, 0, 0]; and R (2)=[Band (2, 0), Band (2, 1), Band (2, 2), Band (2, 3), Band (2, 4)]=[0, 0, 0, 1, 1].

Once the radio-specific band configurations are determined, the MLO configurator system, at step 510, may determine the radio configuration of the wireless networking device by aggregating the radio-specific band configurations. In some examples, the MLO configurator system may perform a vector addition of the radio-specific band configurations of each of the plurality of radios. A vector sum representing the radio configuration (RC_N) of the wireless networking device may be presented as:

$$\text{RC\_N} = R(0) + R(1) + \ldots + R(N-1)$$

Continuing the example from the above, the radio configuration RC_3 may be represented as:

$$\text{RC\_3} = R(0) + R(1) + R(2) = [1, 1, 1, 1, 1]$$

At step 512, the MLO configurator system may determine the MLO configuration for the SSID based on the MLO preference (see step 506) for the SSID and the radio configuration (see step 510) of the wireless networking device. The MLO configuration specifies MLO group RF bands selected from one or more operational RF bands. In one example, the MLO configurator system may perform a vector multiplication of the MLO preference (MLO (P)) and the radio configuration (RC_N). The following expression represents the MLO configuration (MLO_Config) such vector multiplication performed by the MLO configurator system.

$$\text{MLO\_Config} = MLO(P) \times \text{RC\_N}$$

For the ongoing example where the AP has three radios that can support five bands (e.g., 2.4 GHz Wi-Fi band, 5 GHZ LB, 5 GHZ HB, 6 GHZ LB, and 6 GHz HB) and where for a given SSID, the user selects each of the three Wi-Fi bands 2.4 GHZ, 5 GHZ, and 6 GHz Wi-Fi band for MLO, the MLO configuration may be represented as:

$$\text{MLO\_Config} = [1, 1, 1, 1, 1] \times [1, 1, 1, 1, 1] = [1, 1, 1, 1, 1]$$

The MLO_Config of value [1, 1, 1, 1, 1] indicates that for the given SSID, any of the operating bands on each radio may be considered as an MLO group band. For the given example, the MLO group bands are 2.4 GHZ, 5 GHZ LB, 5 GHZ HB, 6 GHZ LB, and 6 GHz HB.

After the MLO configuration defining the MLO group RF bands is determined, the wireless networking device, at step 514, may communicate with client devices over the SSID using the MLO configuration determined at step 512. In particular, the wireless networking device may communicate with the client devices connected over the SSID via the MLO group RF bands identified in the MLO configuration.

Figure 6:
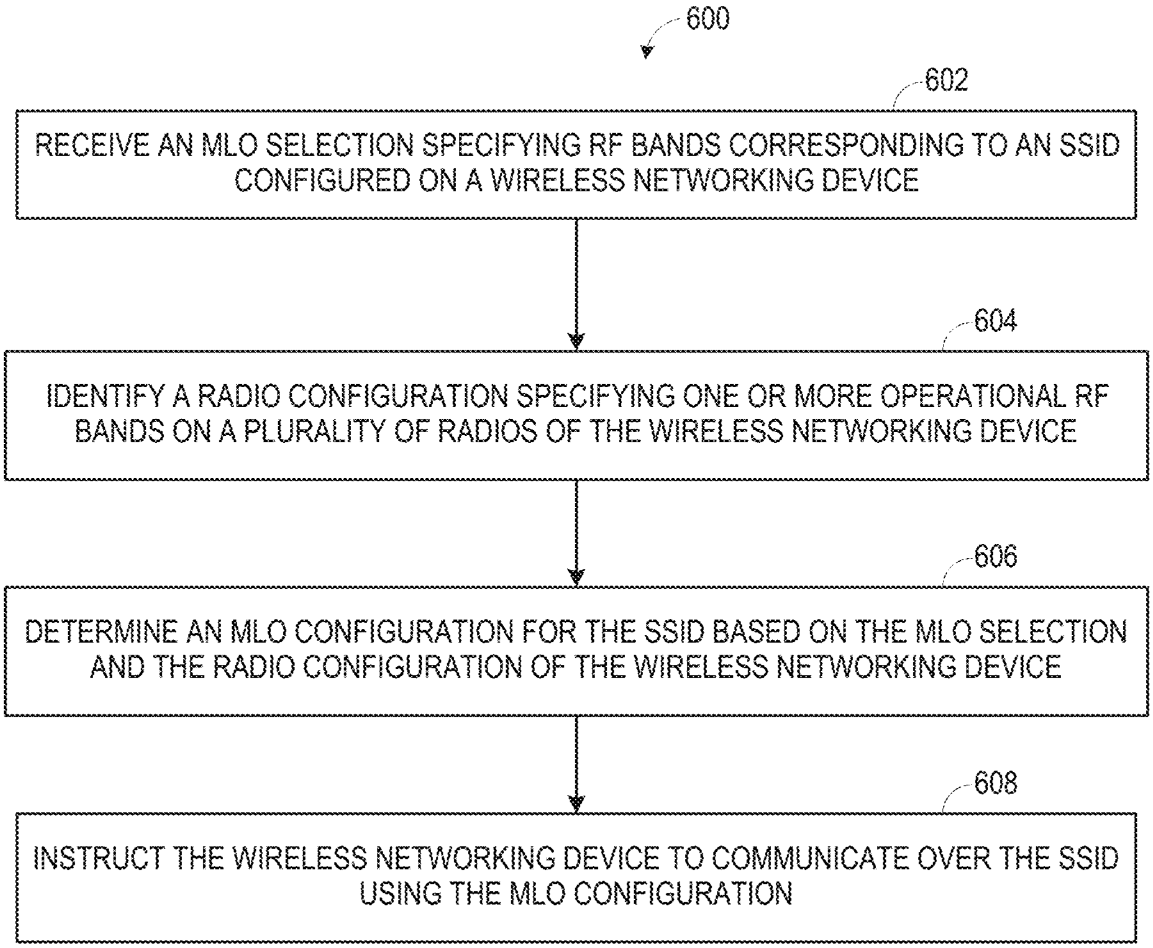
FIG. 6 depicts a flowchart of another example method for configuring MLO by an MLO configurator system hosted on a cloud.

Referring now to FIG. 6, a flowchart of an example method 600 for configuring MLO is depicted. The steps shown in FIG. 6 may be performed by an MLO configurator system, for example, the MLO configurator system 104 hosted on a cloud platform.

At step 602, the MLO configurator system receives an MLO selection specifying one or more radio frequency (RF) bands corresponding to an SSID configured on the wireless networking device. In one example, the MLO configurator system receives MLO selection from an MLO configuration UI. In this case, the MLO configurator system presents the MLO configuration UI on a web page that is accessible to the user using a specific URL or an IP address. The user inputs via the MLO configuration UI specify the Wi-Fi bands that are selected to be included in an MLO group for the SSID.

Further, at step 604, the MLO configurator system identifies a radio configuration of the wireless networking device. The radio configuration of the wireless networking device specifies one or more operational RF bands on a plurality of radios of the wireless networking device. In particular, in one example, the MLO configurator system may query the wireless networking device to provide the details of the Wi-Fi band on which each of the radios is operating. In another example, the wireless networking device is configured to periodically update the MLO configurator system of the operating bands of each of its radios. The MLO configurator may in turn maintain a database of the operating bands and use this information to determine the radio configuration of the wireless networking device. Details of determining the radio configuration have been described in conjunction with FIG. 5.

Further, at step 606, the MLO configurator system determines an MLO configuration for the SSID based on the MLO selection and a radio configuration of the wireless networking device. The radio configuration specifies one or more operational RF bands on a plurality of radios (e.g., the radios 202A-C) of the wireless networking device. For example, the wireless networking device may be configured to operate in any of the modes specified in Table-1 which may in turn specify the radio configuration of the wireless networking device. For example, for the operation of the wireless networking device in mode 3 (Split 5 GHZ, see Table 1), the radios 202A, 202B, and 202C may respectively be operated on 5 GHZ HB, 5 GHZ LB, and 6 GHz FB. Accordingly, the 5 GHZ HB, 5 GHZ LB, and 6 GHz FB are determined as operating bands for the wireless networking device. The MLO configurator system may process (e.g., by way of performing vector operations-described in FIG. 5) both the radio configuration of the wireless networking device and the MLO selection to determine the MLO configuration. The MLO configuration specifies MLO group RF bands selected from one or more operational RF bands. In the example of the wireless networking device operating in the Split 5 GHz mode and the MLO selection specifying all bands for enabling MLO, the MLO configuration may define the MLO group RF bands including all of the 5 GHZ HB, 5 GHz LB, and 6 GHz FB. Detailed steps for determining the MLO configuration are described in conjunction with FIG. 5.

After the MLO configuration defining the MLO group RF bands is determined, the MLO configurator system, at step 608, may instruct the wireless networking device to communicate with client devices over the SSID using the MLO configuration determined at step 606. In particular, the wireless networking device may communicate with the client devices connected over the SSID via the MLO group RF bands identified in the MLO configuration.

Figure 7:
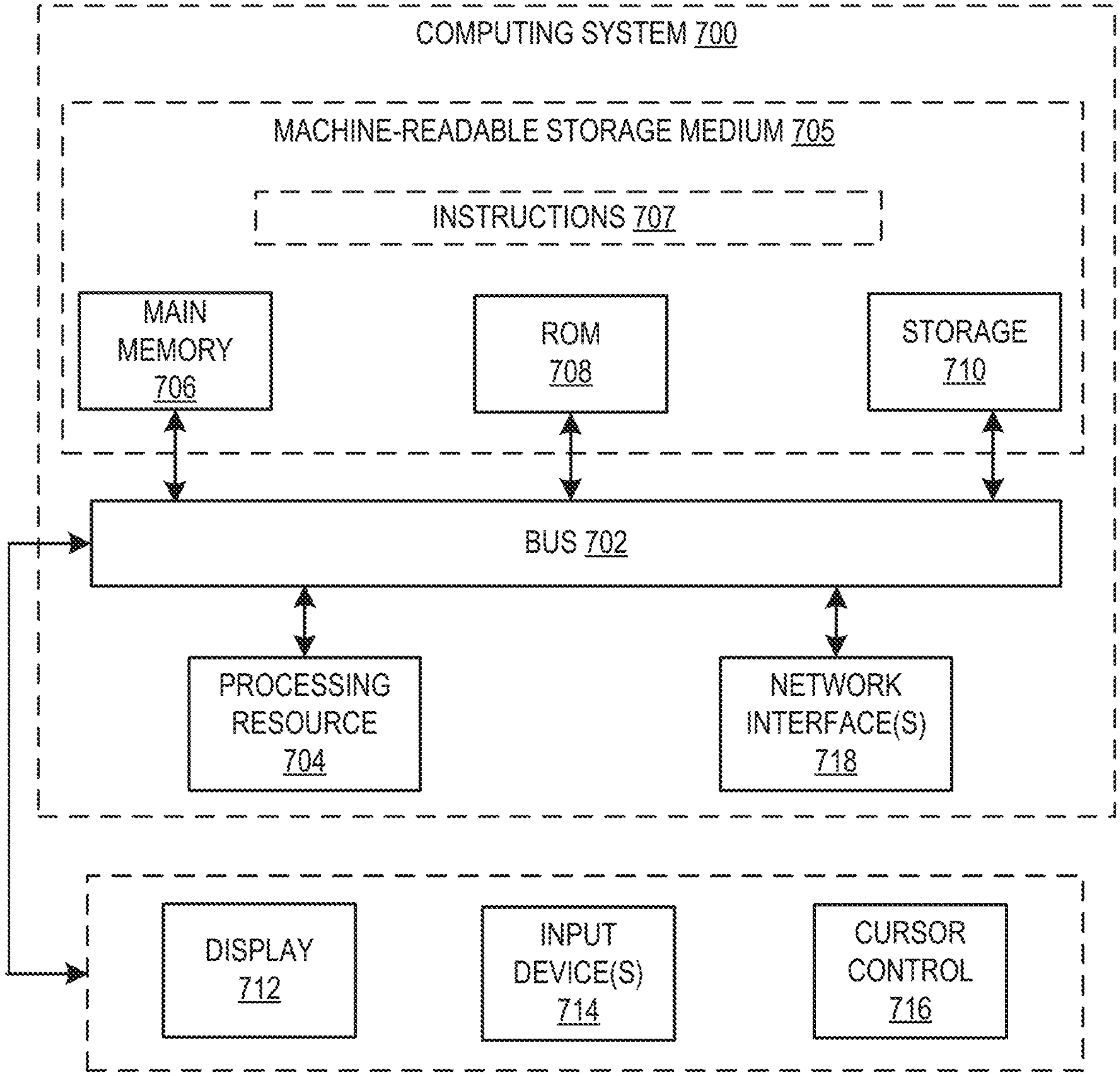
FIG. 7 depicts a block diagram of an example computing system.

FIG. 7 depicts a block diagram of an example computing system 700 in which various of the examples described herein may be implemented. In one example, the computing system 700 may be configured to operate as a wireless networking device (e.g., an AP) such as the wireless networking device 200 of FIG. 2, and can perform various operations described in one or more of the earlier drawings. In another example, the computing system 700 may be any system in a could infrastructure and capable of hosting the MLO configurator system to configure MLO. Examples of the devices and/or systems that may be implemented as the computing system 700 may include, desktop computers, laptop computers, servers, web servers, authentication servers, AAA servers, DNS servers, DHCP servers, IP servers, VPN servers, network policy servers, mainframes, tablet computers, e-readers, netbook computers, televisions and similar monitors (e.g., smart TVs), content receivers, set-top boxes, PDAs, mobile phones, smartphones, smart terminals, dumb terminals, virtual terminals, video game consoles, virtual assistants, IoT devices, and the like.

The computing system 700 may include a bus 702 or other communication mechanisms for communicating information, a hardware processor, also referred to as processing resource 704, and a machine-readable storage medium 705 coupled to the bus 702 for processing information. In some examples, the processing resource 704 may include one or more CPUs, semiconductor-based microprocessors, and/or other hardware devices suitable for retrieval and execution of instructions stored in the machine-readable storage medium 705. The processing resource 704 may fetch, decode, and execute instructions to configure MLO for SSIDs. As an alternative or in addition to retrieving and executing instructions, the processing resource 704 may include one or more electronic circuits that include electronic components for performing the functionality of one or more instructions, such as an FPGA, an ASIC, or other electronic circuits.

In some examples, the machine-readable storage medium 705 may include a main memory 706, such as a RAM, cache and/or other dynamic storage devices, coupled to the bus 702 for storing information and instructions to be executed by the processing resource 704. The main memory 706 may also be used for storing temporary variables or other intermediate information during the execution of instructions to be executed by the processing resource 704. Such instructions, when stored in storage media accessible to the processing resource 704, render the computing system 700 into a special-purpose machine that is customized to perform the operations specified in the instructions. The machine-readable storage medium 705 may further include a read-only memory (ROM) 708 or other static storage device coupled to the bus 702 for storing static information and instructions for the processing resource 704. Further, in the machine-readable storage medium 705, a storage device 710, such as a magnetic disk, optical disk, or USB thumb drive (Flash drive), etc., may be provided and coupled to the bus 702 for storing information and instructions.

In some examples, the computing system 700 may be coupled, via the bus 702, to a display 712, such as a liquid crystal display (LCD) (or touch-sensitive screen), for displaying information to a computer user. In some examples, an input device 714, including alphanumeric and other keys (physical or software generated and displayed on a touch-sensitive screen), may be coupled to the bus 702 for communicating information and command selections to the processing resource 704. Also, in some examples, another type of user input device such as a cursor control 716 may be connected to the bus 702. The cursor control 716 may be a mouse, a trackball, or cursor direction keys. The cursor control 716 may communicate direction information and command selections to the processing resource 704 for controlling cursor movement on the display 712. In some other examples, the same direction information and command selections as cursor control may be implemented via receiving touches on a touch screen without a cursor.

In some examples, the computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 700 also includes a network interface 718 coupled to bus 702. The network interface 718 provides a two-way data communication coupling to one or more network links that are connected to one or more local networks. For example, the network interface 718 may be an integrated services digital network (ISDN) card, cable modem, satellite modem, or a modem to provide a data communication connection to a corresponding type of telephone line. As another example, the network interface 718 may be a local area network (LAN) card or a wireless communication unit (e.g., Wi-Fi chip/module).

In some examples, the machine-readable storage medium 705 (e.g., one or more of the main memory 706, the ROM 708, or the storage device 710) stores instructions 707 which when executed by the processing resource 704 may cause the processing resource 704 to execute one or more of the methods/operations described hereinabove. The instructions 707 may be stored on any of the main memory 706, the ROM 708, or the storage device 710. In some examples, the instructions 707 may be distributed across one or more of the main memory 706, the ROM 708, or the storage device 710. In some examples, the instructions 707 when executed by the processing resource 704 may cause the processing resource 704 to perform one or more of the methods described in any of FIGS. 4-6.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising:

receiving, by a processor disposed in a wireless networking device, a Multi-Link Operation (MLO) selection specifying, for an indicated Service Set Identifier (SSID) configured on the wireless network device, (i) whether MLO is enabled or disabled for the indicated SSID and (ii) radio frequency (RF) bands to include in an MLO group for the indicated SSID, wherein receiving the MLO selection comprises:

presenting, by the processor, a user interface (UI) to a user; and receiving, by the processor, a user input indicating the MLO selection via the UI;

determining, by the processor, an MLO configuration for the indicated SSID based on the MLO selection and a radio configuration of the wireless networking device, wherein the radio configuration specifies operational RF bands on a plurality of radios of the wireless networking device, and wherein the MLO configuration specifies an MLO group of RF bands selected from the operational RF bands and based on the specified RF bands to include in the MLO group;

determining, by the processor, an MLO preference based on the MLO selection, wherein the MLO preference comprises the RF bands and one or more RF sub-bands within the RF bands that the user prefers to include in the MLO group of RF bands for the indicated SSID, wherein the MLO preference and the radio configuration are represented as vectors, and wherein determining the MLO configuration comprises performing a vector multiplication of the MLO preference and the radio configuration; and communicating, by the processor, with a client device over the indicated SSID using the MLO configuration.

2. The method of claim 1, wherein the operational RF bands comprise a full radio frequency range of RF bands available for wireless local area network (WLAN) communication or a sub-frequency range in one or more of the RF bands available for the WLAN communication.

3. The method of claim 1, further comprising:

determining, by the processor for each radio of the plurality of radios, a band configuration specifying the operational RF bands configured for the each radio; and determining, by the processor, the radio configuration of the wireless networking device by aggregating the band configuration of the plurality of radios.

4. The method of claim 3, wherein the band configuration of each of the plurality of radios is represented as a vector, wherein aggregating the band configuration comprises performing a vector addition of the band configuration of each of the plurality of radios.

5. The method of claim 1, wherein the wireless networking device is an access point.

6. A method comprising:

receiving, by a processor communicatively coupled to a wireless networking device, a Multi-Link Operation (MLO) selection specifying, for an indicated Service Set Identifier (SSID) configured on the wireless network device, (i) whether MLO is enabled for the indicated SSID and (ii) radio frequency (RF) bands to include in an MLO group for the indicated SSID, wherein receiving the MLO selection comprises:

presenting, by the processor, a user interface (UI) to a user; and receiving, by the processor, a user input indicating the MLO selection via the UI;

identifying, by the processor, a radio configuration specifying operational RF bands on a plurality of radios of the wireless networking device;

determining, by the processor, an MLO configuration for the indicated SSID based on the MLO selection and the radio configuration of the wireless networking device, wherein the MLO configuration specifies an MLO group of RF bands selected from the operational RF bands and based on the specified RF bands to include in the MLO group;

determining, by the processor, an MLO preference based on the MLO selection, wherein the MLO preference comprises the RF bands and one or more RF sub-bands within the RF bands that the user prefers to include in the MLO group RF bands for the indicated SSID;

determining, by the processor for each radio of the plurality of radios, a band configuration specifying the operational RF bands configured for the each radio;

determining, by the processor, the radio configuration of the wireless networking device by aggregating the band configuration of the plurality of radios; and instructing, by the processor, the wireless networking device to communicate with a client device over the indicated SSID using the MLO configuration.

7. The method of claim 6, wherein the band configuration of each of the plurality of radios is represented as a vector, wherein aggregating the band configuration comprises performing, by the processor, a vector addition of the band configuration of each of the plurality of radios.

8. The method of claim 6, wherein the MLO preference and the radio configuration are represented as vectors, and wherein determining the MLO configuration comprises performing, by the processor, a vector multiplication of the MLO preference and the radio configuration.

9. The method of claim 6, wherein the processor is hosted on a cloud infrastructure communicatively coupled to the wireless networking device.

10. The method of claim 6, wherein the wireless networking device is an access point.

11. A wireless networking device comprising:

a plurality of radios for communicating over operational radio frequency (RF) bands; and a machine-readable storage medium storing executable instructions;

a processor coupled to the plurality of radios and the machine-readable storage medium, wherein the processor is configured to execute one or more of the instructions to:

receive a Multi-Link Operation (MLO) selection specifying, for an indicated Service Set Identifier (SSID) configured on the wireless network device, (i) whether MLO is enabled for the SSID and (ii) RF bands to include in an MLO group for the indicated SSID, wherein the processor is further configured to execute one or more of the instructions to:

present a user interface (UI) to a user; and receive a user input indicating the MLO selection via the user interface;

determine an MLO configuration for the indicated SSID based on the MLO selection and a radio configuration of the wireless networking device, wherein the radio configuration specifies the operational RF bands on the plurality of radios of the wireless networking device, wherein the MLO configuration specifies an MLO group of RF bands selected from the operational RF bands and based on the specified RF bands to include in the MLO group;

determine an MLO preference based on the MLO selection, wherein the MLO preference comprises the RF bands and one or more RF sub-bands within the RF bands that the user prefers to include in the MLO group of RF bands for the indicated SSID, wherein the MLO preference and the radio configuration are represented as vectors, and wherein determining the MLO configuration comprises performing a vector multiplication of the MLO preference and the radio configuration; and communicate with a client device over the indicated SSID using the MLO configuration.

12. The wireless networking device claim 11, wherein the processor is further configured to execute one or more of the instructions to:

determine, for a radio of the plurality of radios, a band configuration specifying the RF bands configured for the radio; and determine the radio configuration of the wireless networking device by aggregating the band configuration of the plurality of radios.

* * * * *